United States Patent [19]

Robra et al.

[11] Patent Number: 4,525,602
[45] Date of Patent: Jun. 25, 1985

[54] METHOD OF AND A CIRCUIT FOR ENERGIZING A SUBSCRIBER'S CIRCUIT IN A TELEPHONE SYSTEM

[75] Inventors: Joerg Robra, Heroldsberg; Hans Goschin, Nuremberg, both of Fed. Rep. of Germany

[73] Assignee: TE KA DE Felten & Guilleaume Fernmeldeanlagen GmbH, Nuwenbweg, Fed. Rep. of Germany

[21] Appl. No.: 424,979

[22] Filed: Sep. 27, 1982

[30] Foreign Application Priority Data

Sep. 29, 1981 [DE]  Fed. Rep. of Germany ....... 3138649

[51] Int. Cl.³ .......................................... H04M 19/00
[52] U.S. Cl. ................................. 179/16 F; 179/81 R
[58] Field of Search ............. 179/16 F, 16 A, 16 AA, 179/18 FA, 170 D, 18 F, 81 R; 323/268, 269, 270, 273, 274, 312, 315, 316; 330/297

[56] References Cited

FOREIGN PATENT DOCUMENTS 2556157 5/1978 Fed. Rep. of Germany .

Primary Examiner—Gene Z. Rubinson
Assistant Examiner—James L. Dwyer
Attorney, Agent, or Firm—Michael J. Striker

[57] ABSTRACT

A method of energizing a subscriber's circuit in a telephone system having two separate constant-current sources arranged symmetrically to the subscriber's station is disclosed. Current flowing through the two lines of the circuit is measured by a shunt, and differences between the line currents are compensated by a regulating device which applies such reference voltages to respective current sources as to supply a maximum permissible current in each line. If this maximum value is exceeded, then the regulating device automatically turns off, and a reduced reference voltage is applied to the current sources so as to return to the maximum permissible value of the curent.

6 Claims, 1 Drawing Figure

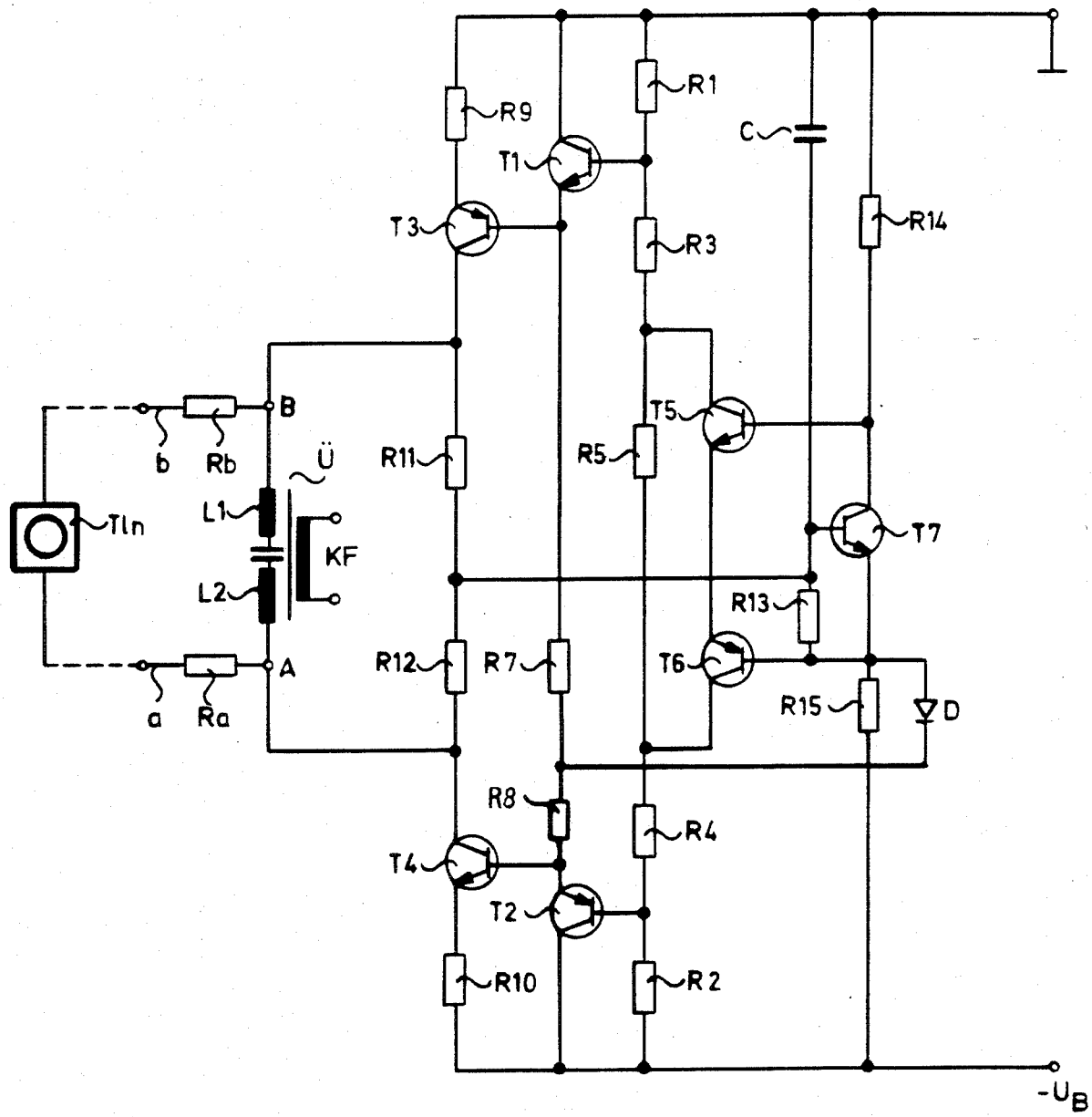

4,525,602

METHOD OF AND A CIRCUIT FOR ENERGIZING A SUBSCRIBER'S CIRCUIT IN A TELEPHONE SYSTEM

BACKGROUND OF THE INVENTION

The present invention relates in general to a method of and a device for feeding current in a subscriber's line in a telephone system having two independent constant-current sources arranged symmetrically to the subscriber's apparatus in the circuit so as to supply constant current independently of the length of the circuit.

From the German published patent application No. 2,556,157 a circuit arrangement of this kind is known in which current differences between the two branches of the subscriber's circuit are measured by means of a shunt and, in the case of different current values, a regulating device is employed to apply corresponding reference voltages to the constant-current sources so as to compensate for the current differences upwardly to a maximum current value. The two constant-current sources are constituted by a Darlington circuit of two transistors. One of the telephone lines is connected via the collector-emitter path of one of the transistors of the constant-current source to the positive pole of a central power source, such as a battery. The other telephone line is connected via the collector-emitter path of one of the transistors in the second constant-current source to the negative pole of the battery. The reference voltages for the constant-current sources are adjusted by means of voltage dividers. The regulating device includes two series-connected resistors bridging the circuit and acting as the measuring shut. In the occurrence of different current values measured between the two telephone lines of the circuit, the regulating device by suitably adjusting the reference voltages in at least one constant-current source restores the original current conditions, that is it provides, independently from the resistance of the subscriber's circuit, a uniform constant current in both branches of the telephone circuit. In order to prevent the generation of an excessively high circuit current, which may result for example by activation of a ground button at the subscriber's apparatus, a zener diode is connected to the common point of the series-connected shunting resistors. In this manner, the current through the subscriber's circuit is limited to a maximum permissible value.

The disadvantage of this prior-art energizing device can be seen in the fact that, in the case of a very low resistance of the telephone circuit to ground, no reduction of the power loss will occur. Moreover, it is also disadvantageous that the resulting non-symmetrical voltages in the telephone circuit influence the voltage regulation. The non-linear regulating characteristic cannot sufficiently eliminate this voltage asymmetry.

SUMMARY OF THE INVENTION

It is therefore a general object of the present invention to overcome the aforementioned disadvantages.

In particular, an object of the invention is to provide an improved method for energizing a subscriber's circuit of the aforedescribed kind, which makes it possible to reduce power losses.

Another object of this invention is to provide such an improved method which permits a regulation only for specifically different current values in the circuit or for direct-current voltages modulated by a low-frequency component.

In keeping with these objects and others which will become apparent hereafter, one feature of the invention resides, in a method of energizing a subscriber's circuit in a telephone system of the aforedescribed kind, in the steps of measuring current differences between the lines by a shunt, then applying to at least one of the constant-current sources a reference voltage produced in response to data from the shunt to compensate for current differences by increasing current in the deficient line to a predetermined maximum current value by means of a regulating device, and after the current in the circuit has exceeded said predetermined value, inactivating the regulating device and compensating for current differences by decreasing reference voltages in the constant-current sources. Preferably, upon exceeding the permissible maximum limit value of the current in the circuit, the reference voltages in the constant-current sources are reduced to the same value.

The advantage of the method of this invention is not only in the fact that thermal overload in the current sources is prevented when the telephone lines are short-circuited to ground or when the ground button at the subscriber's apparatus is activated for a prolonged period of time, but also the method reduces power losses in the circuit.

In an embodiment of a circuit arrangement for carrying out the method of this invention, the regulating device is connected to the common point of two series-connected resistors shunting the subscriber's circuit. The compensating reference voltages are derived from voltage dividers connected to respective current sources and interconnected by a resistor forming a part of the regulating device. Parallel to this resistor are connected in series the collector-emitter path of two transistors. The bases of these two transistors are interconnected by a collector-emitter path of a regulating transistor. The base of the latter transistor is connected to the common connection point of the shunt resistors and via a capacitor to one pole of the operational power source. This pole (positive) is also connected by a resistor to the collector of the regulating transistor. The emitter of the regulating transistor is connected via a resistor to the opposite pole of the power supply.

For reducing the power loss in the circuit of this invention additional resistors can be inserted in the series connection of voltage dividers between the poles of the power supply. In this manner, the reference voltage for each constant-current source is lowered, and the current in the subscriber's circuit is reduced. In addition, the two transitors bridging the regulating resistor are blocked, so that simultaneously with the reduction of the circuit current the regulation is inactivated.

Due to the non-linear regulating characteristic of the regulating device, alternating currents in the telephone circuit would be insufficiently attenuated. By means of the aforementioned capacitor the requisite attenuation of asymmetric voltages in the telephone circuit is attained in the simplest manner.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE illustrates by way of an example a diagram of a circuit arrangement for performing the method of this invention.

DESCRIPTION OF THE PREFERRED EMBODIMENT

A subscriber's circuit constituted by telephone lines a and b, a subscriber's station TLN and a coupling telephone transformer U, are electronically energized by direct current by sources of constant current connected to respective lines a and b. When the constant-current sources are connected in series, then asymmetries introduced for example by leakages of employed component parts, may cause that one of the two current sources is brought into a saturated state of its transistors. By means of the regulating device, the transistors of the two constant-current sources can be operated in their linear range of characteristic lines.

In the drawing, the resistance of individual telephone lines a and b, the lengths of which can differ from each other, is indicated by resistors $R_a$ and $R_b$. The two constant-current sources are connected to the assigned telephone lines at connection points A and B. Each of the current sources includes two transistors and a resistor, namely transistors T1, T3 and resistor R1 and transistors T2, T4 and resistor R10. The base of transistor T1 is connected to a first voltage divider R1 and R3 and the base of transistor T3 is connected to the second voltage divider R4 and R2. The two voltage dividers are interconnected by regulating resistor R5, so that voltages tapped at respective dividers serve as reference voltages for the constant-current sources. The emitters of transistors T3 and T4 are connected by the resistors R9 and R10 to the + pole and to the − pole of the operating power source $U_b$. The emitters of transistors T1 and T2 are interconnected by resistors R7 and R8, whereby the emitter of the transistor T1 is connected to the base of transistor T3, and the emitter of transistor T2 is connected to the base of transistor T4. The collectors of transistors T3 and T4 are connected to the assigned circuit lines b and a at connection points B and A, to which also secondary coils L1 and L2 and series-connected shunt resistors R11 and R12 are connected. During a telephone connection, speech voltage is applied between the connection points A and B via the coupling transformer U. The secondary coils L1 and L2 are connected in series with a capacitor. The primary coil of the transformer is connected to a coupling field KF of an exchange station.

The reference voltages tapped at common points of dividers R1, R3 and R4, R2 are amplified by the assigned transistors T1 and T2. The particular connection of two transistors in each constant-current source as illustrated in the FIGURE has the effect that, when the temperature characteristics of the base-emitter diodes of respective transistor pairs are substantially compensated. When the subscriber's circuit is closed, that is, if the user picks up the receiver at the subscriber's station TLN, such as a telephone apparatus for example, then a circuit current determined by the reference voltages at respective voltage dividers R1, R3 and R4, R2 starts flowing through the station TLN. In this case, the regulating resistor R5 is bridged by series-connected collector-emitter paths of the two transistors T5 and T6.

The bases of the two transistors T5, T6, as mentioned before, are connected by the collector-emitter path of transistor T7. The base of the transistor T7 is connected to the common point of the series-connected shunt resistors R11 and R12. If transistor T7 is blocked, then the transistors T5 and T6 are active. The required base current for the two transistors T5 and T6 is derived from the operative power source $U_b$. For this purpose, the base of transistor T5 is connected by resistor R14 to the positive pole, and the base of transistor T6 via equal resistor R15 to the negative pole of the operating voltage source $U_b$.

If the current supply transistor T3 of the first constant-current source delivers lower constant current than the supply transistor of the second constant-current source, then different voltages are developed across respective resistors R11 and R12 of the series-connected shunt. The resistance value of the two resistors R11 and R12 are of the same magnitude, so that always one half of the speech voltage on the secondary of the coupling transformer U is measured across respective resistors R11 and R12. In the event that equal currents flow through the telephone lines a and b, the same direct-current voltage drop is also produced on the two shunt resistors. If, however, voltage drop on resistor R11 is lower than across resistor R12, then a potential difference is detectable on the common connection points between the shunt resistors. This common connection point is further connected to a resistor R13 leading to the base of transistor T6. The shift of potential on the connecting point between resistors R12 and R13 thus produces a current flow through the resistor R13, which causes a more negative potential on the base of transistor T6, and due to the fact that the T6 and T5 are interconnected, the potentials on the collectors of the two transistors T5 and T6 become also more negative. Voltage dividers R1, R3 and R4, R2 consequently apply the increased negative potential to the base of transistors T2 and T3. Consequently, reference voltage for the current source consisting of transistors T2 and T4 is lowered, whereas the reference voltage for the constant-current source consisting of transistors T1 and T3 is proportionally increased. In this manner, the first-mentioned current source T1, T3 delivers more current through the resistor R11 until the balance between the voltage drops across the resistors R11 and R12 is re-established.

Imbalance, caused for example by different tolerances of component parts in the current sources, is also compensated for by the regulating feedback loop in voltage dividers R1, R3 and R2, R4. This feedback regulation is effective only for static imbalances or for low-frequency superimposed voltages. In order to prevent the regulating process from being affected by asymmetrical or speech voltages a capacitor C is connected between the base of transistor T7 and the positive pole of the operating power supply $U_b$. The capacitor C attenuates the asymmetrical voltages in the speech range which could not be compensated for by the non-linear regulating characteristic.

The actuation of ground button at the subscriber's station or ground short-circuit of the circuit also produce a shift of symmetry of the voltage drop on the resistor R11 or R12 which cannot be compensated for by the aforedescribed regulation. The anode of the diode D is connected to the connection points between resistors R13 and R15, and the cathode of the diode D is connected to the connecting point between resistors R7 and R8 where the potential is more positive than the center of the operating voltage. Upon actuation of the ground button, for example the telephone line a is grounded, and therefore the current source connected to the other telephone line b is without current. As a result, voltage at the cathode of the diode D rises to a point at which the diode becomes conductive, and an increased voltage drop is produced across resistor R13, causing the activation of transistor T7. The series-connected transistors T5 and T6 are turned off, and consequently the regulating resistor R5 in the chain of resistors becomes effective. Due to the resistor R5, the reference voltages for the two constant-current sources are lowered, and the current flowing through the telephone circuit is reduced to a corresponding lower value. Simultaneously, by turning off the transistor T6, the symmetry regulation is interrupted, and a thermal overload of transistor T4 is thus avoided.

It will be understood that each of the elements described above, or two or more together, may also find a useful application in other types of constructions differing from the types described above.

While the invention has been illustrated and described as embodied in a specific example of a circuit for energizing a subscriber's telephone loop, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of energizing a subscriber's circuit in a telephone system having two separate constant-current sources each connected to a respective subscriber circuit line to supply constant current to the circuit lines irrespective of their length, comprising the steps of measuring current differences between the lines by a shunt, applying to at least one of said constant-current sources a reference voltage produced in response to voltage drops across said shunt to compensate for current difference between the lines by increasing via regulating device current in the respective subscriber line to a predetermined maximum value, and after the current in the circuit exceeds said predetermined value, inactivating the regulating device and decreasing the reference voltages in respective current sources.

2. A method as defined in claim 1, wherein after exceeding the maximum current value the reference voltages in the current sources are reduced to the same value.

3. A circuit arrangement for energizing a subscriber's circuit in a telephone system having two separate constant-current sources each connected to a respective subscriber circuit line to supply constant current to the circuit lines irrespective of their length, comprising a shunt constituted by two series-connected equal resistors connected to the subscriber's circuit at the connection points of respective constant-current sources, a reference voltage regulating device including a voltage divider assigned to each constant current source and a regulating fixed resistor interconnecting the two voltage dividers, and a controllable resistance bridging the fixed regulating resistor to control said voltage dividers in response to the potential across the shunt resistors.

4. A circuit arrangement as defined in claim 3, wherein said controllable resistance is formed by collector-emitter paths of two series-connected transistors, the bases of the two transistors being connected to an emitter-collector path of a control transistor the base of which is connected to the connection point between the shunt resistors and is grounded by an attenuation capacitor, the collector and the emitter of the control transistor being connected to assigned source of operational voltage by equal resistors.

5. A circuit arrangement as defined in claim 4, further comprising a resistor connected between the connection points of the shunt resistors and the base of one of the two series-connected transistors, and further being connected via a diode to a voltage divider between the two current sources.

6. A circuit arrangement as defined in claim 5, wherein each of said current sources includes a pair of transistors, one of said transistors having its collector connected to the assigned subscriber line, its base connected to the emitter of the other transistor, and its emitter connected to a power source via a resistor, the collector of the other transistor being connected directly to the power source and the base of the other transistor being connected to the assigned voltage divider for receiving the reference voltage, whereby the emitter of the other transistor being interconnected by the voltage divider cooperating with said diode.

* * * * *